US006029355A

United States Patent [19]

Carlin

[11] Patent Number: 6,029,355

[45] Date of Patent: Feb. 29, 2000

[54] DEVICE FOR CUTTING SOIL SAMPLING TUBING

[75] Inventor: Michael B. Carlin, Salina, Kans.

[73] Assignee: Kejr Engineering, Inc., Salina, Kans.

[21] Appl. No.: 08/919,076

[22] Filed: Aug. 27, 1997

[51] Int. Cl.[7] .................... B23D 21/06

[52] U.S. Cl. .................... 30/92.5; 30/287; 30/294; 30/304; 30/317

[58] Field of Search .................... 30/90.4, 92.5, 30/304, 317, 2, 286, 287, 92, 280, 284, 285, 289, 294, 299, 314; 83/54

[56] References Cited

U.S. PATENT DOCUMENTS

| | | | |
|---|---|---|---|
| 631,259 | 8/1899 | Pancoast | 30/304 X |
| 983,515 | 2/1911 | Pancoast | 30/304 X |
| 1,629,696 | 5/1927 | Goff | 30/92.5 |
| 2,329,805 | 9/1943 | Wilson, Sr. | 30/92.5 X |
| 2,412,149 | 12/1946 | Higgins | 30/304 X |
| 2,729,889 | 1/1956 | Trinski | 30/286 |
| 4,001,934 | 1/1977 | Bell | 30/92.5 X |
| 4,493,148 | 1/1985 | Ruff | 30/2 |
| 4,667,409 | 5/1987 | D'Amato | 30/287 X |
| 5,293,791 | 3/1994 | Allen et al. | 30/90.4 X |
| 5,438,760 | 8/1995 | Charlier | 30/304 |
| 5,511,305 | 4/1996 | Garner | 30/90.4 X |

OTHER PUBLICATIONS

AMS Advertisement for PowerProbe 9600 Direct Push Models. (Date unknown).

*Primary Examiner*—Clark F. Dexter
*Attorney, Agent, or Firm*—Shook, Hardy & Bacon, LLP.

[57] ABSTRACT

A device for longitudinally cutting tubing is comprised of a block presenting an engaging surface for receiving tubing, blades and protective guards both coupled to the block and both extending beyond the engaging surface, and a handle coupled to the block. When cutting tubing, the device receives the tubing so that each of the blades cuts at an angle less than 90 degrees with respect to the tangent line of the tubing at the point where each contacts the tubing. This device may be used in a method for cutting tubing comprised of securing a section of tubing, receiving the tubing with the engaging surface of the device, contacting an end of the tubing with at least one blade wherein the blade is positioned at an angle less than 90 degrees with respect to the tangent line of the tubing at the point where the blade contacts the tubing, and cutting the tubing by pulling the block longitudinally along the tubing. This device and method present an easier way for longitudinally cutting tubing and allow multiple cuts to be made simultaneously.

6 Claims, 2 Drawing Sheets

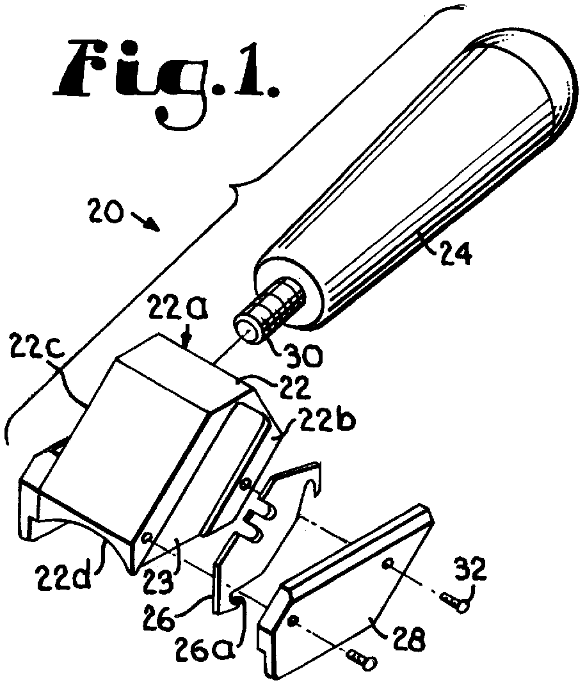
Fig.1.
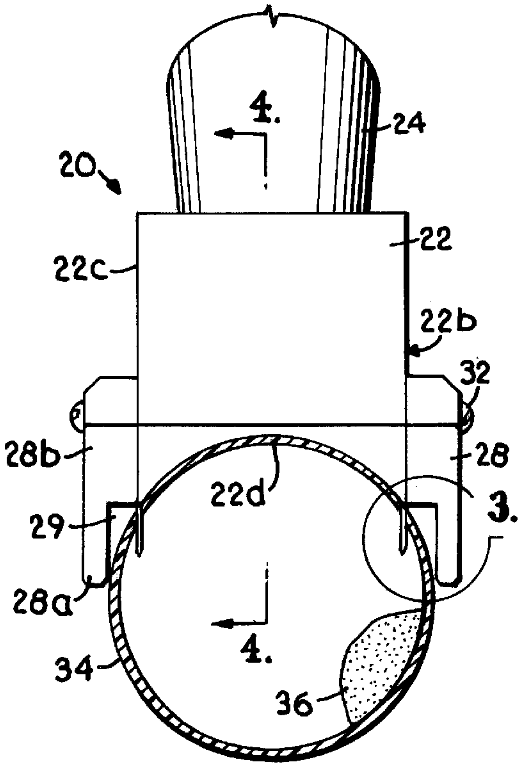
Fig.2.
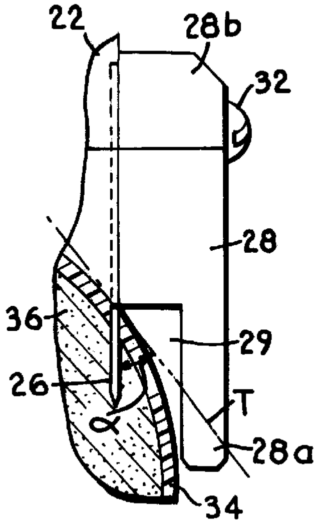
Fig.3.
Fig.4.
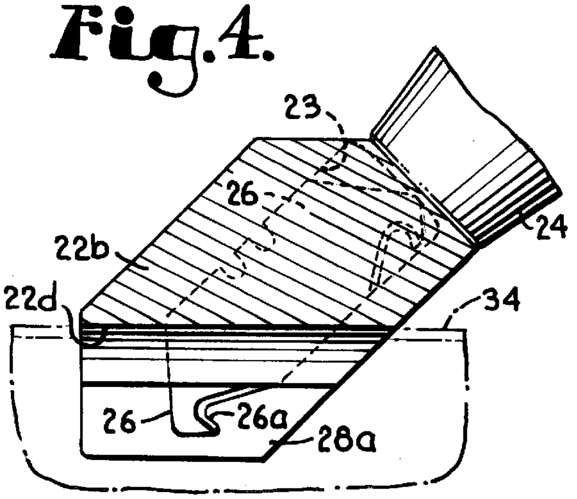

DEVICE FOR CUTTING SOIL SAMPLING TUBING

BACKGROUND OF THE INVENTION

The present invention relates to a device and method for cutting tubing. More specifically, this device and method present an easier way for longitudinally cutting tubing and allow multiple cuts to be made simultaneously.

Soil sampling has become important in a variety of fields, such as site inspections for soil strata determinations or environmental factors. It is often desirable to analyze the soil's composition at various depths. In analyzing soil, soil samplers are used to collect soil from the subsurface of the ground. Several of the soil samplers on the market today use a polymer liner or tubing within the soil sampler to hold the soil once it has been sampled from the subsurface. In these devices, soil samples are then removed from the tubing by making one or more longitudinal cuts in the tubing. This allows the soil to be sub-sampled or removed from the tubing in small amounts so that nothing is lost.

The industry presently relies upon simple utility knives to cut this tubing. However, using utility knives is inefficient and at times unsafe. In addition to being difficult to cut tubing with simple utility knives, multiple cuts sometimes must be made before a section of the tubing may be removed, allowing the soil to be sub-sampled.

A cutting device has been proposed which has a single blade that cuts perpendicular to the tangent line of the tubing at the point where the blade contacts the tubing. Such a device is unsuccessful because as the tubing is cut, residual stresses are relieved which result in the tubing collapsing slightly. This causes a binding action against the blade and makes it difficult to pull the blade through the tubing. It is especially difficult to cut in a straight line with such a cutting device. In addition, in order to make multiple longitudinal cuts, each cut must be made separately, and the tubing must then be rotated before an additional cut is made.

Thus, a cutting tool is needed which is able to safely and easily cut tubing. Further, a device is needed that will simply, efficiently and economically perform this function. A device is also needed which is able to make at least two parallel longitudinal cuts in a section of tubing simultaneously with little effort.

SUMMARY OF THE INVENTION

It is an object of the present invention to provide a simple, efficient, and economical device and method for cutting tubing.

Another object of the present invention is to provide a device which cuts tubing easily by cutting the tubing at an angle which is less than 90 degrees with respect to the tangent line of the tubing at the point where the blade of the device contacts the tubing and a method for using this device.

It is a further object of the present invention to provide a device for cutting tubing which makes at least two cuts simultaneously and a method for using this device.

It is another object of the present invention to provide a device for cutting tubing which safely shields the operator from the blade of the device while cutting the tubing and a method for using this device.

Another object of this invention is to provide a device which cuts an entire longitudinal section from the tubing in a single motion and a method for using this device.

According to the present invention, the foregoing and other objects are achieved by a device for longitudinally cutting tubing comprised of a block presenting an engaging surface for receiving tubing, blades and protective guards both coupled to the block and both extending beyond the engaging surface, and a handle coupled to the block. When cutting tubing, the device receives the tubing so that each of the blades cuts at an angle less than 90 degrees with respect to the tangent line of the tubing at the point where each contacts the tubing. The present invention further includes a method for cutting tubing using the above-described device comprised of securing a section of tubing, receiving the tubing with the engaging surface of the device, contacting an end of the tubing with at least one blade wherein this blade is positioned at an angle less than 90 degrees with respect to the tangent line of the tubing at the point where the blade contacts the tubing, and cutting the tubing by pulling the block longitudinally along the tubing.

BRIEF DESCRIPTION OF THE DRAWINGS

The attached drawings are included as part of the specification and are to be read in conjunction with the specification. Like reference numerals are used to indicate like parts in various views.

FIG. 1 is an exploded top perspective view of the device of the present invention;

FIG. 2 is a front elevational view of the device shown in FIG. 1 receiving cylindrical tubing with parts being broken away to reveal details of construction;

FIG. 3 is an enlarged vertical cross-sectional view of the blade, protective guard and tubing within the captured region (3) of FIG. 2;

FIG. 4 is a vertical cross-sectional view taken generally along line 4—4 of FIG. 2;

DETAILED DESCRIPTION OF THE PREFERRED EMBODIMENT

Figure 5:
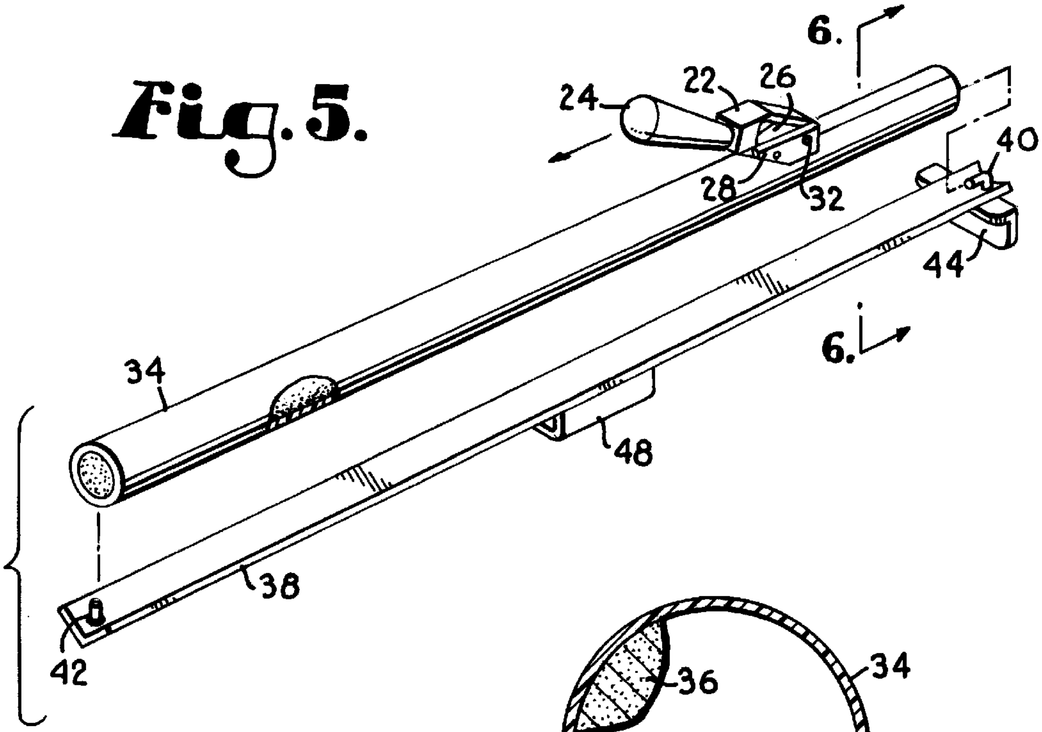
FIG. 5 is an exploded perspective view of the device of the present invention in operation.

A device for cutting tubing embodying the principles of this invention is broadly designated in the drawings by reference numeral 20 and is shown in its entirety in FIG. 1, FIG. 2, and FIG. 5. Device 20 is primarily comprised of a block 22, a handle 24, blades 26, and protective guards 28. Block 22 has an end 22*a*, sides 22*b* and 22*c*, and a concave engaging surface 22*d* opposite of end 22*a*.

Handle 24 is coupled to a threaded fastener 30, as shown in FIG. 1. Threaded fastener 30 is received by end 22*a* and secures handle 24 to block 22. Sides 22*b* and 22*c* have indentations 23 which receive blades 26, as shown in FIG. 1 and FIG. 4. Protective guards 28 are placed over blades 26 and are secured to sides 22*b* and 22*c* by screws 32. Relief area 29, shown in FIG. 2 and FIG. 3, is defined between protective guards 28 and blades 26. Concave engaging surface 22*d* receives cylindrical tubing 34 which may contain soil 36, as shown in FIG. 2 and FIG. 5.

Figure 6:
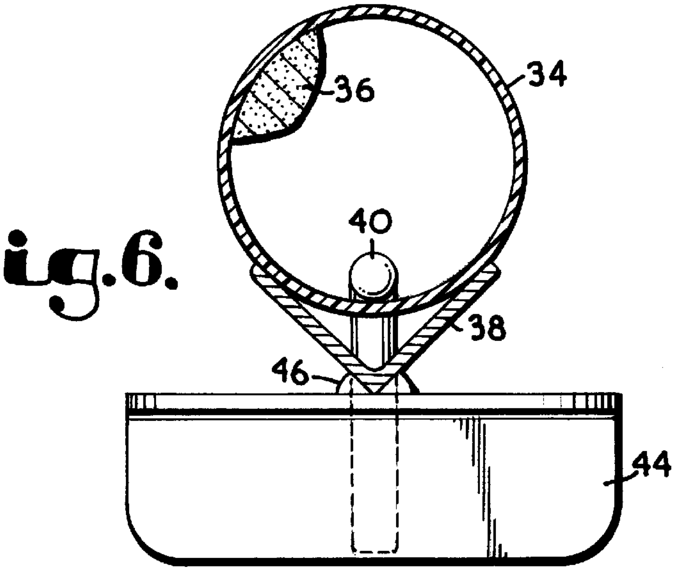
FIG. 6 is a vertical cross-sectional view taken generally along line 6—6 of FIG. 5.
Figure 7:
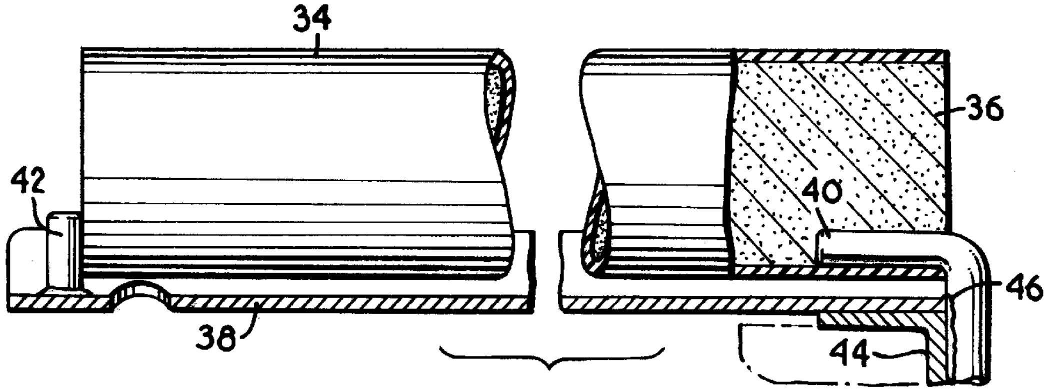
FIG. 7 is an enlarged fragmentary side view of a section of cylindrical tubing secured by a holding structure.

Preferably, cylindrical tubing 34 is placed on a V-shaped holding structure 38 and secured to structure 38 by J-shaped projection 40 and projection 42 by placing an edge of cylindrical tubing 34 underneath J-shaped projection 40, as shown in FIG. 6 and FIG. 7. Also attached to holding structure 38 is surface-edge brace 44, shown in FIG. 5 and FIG. 6, which is coupled to the end of structure 38 by welding 46. Vise receiver 48 is coupled underneath structure 38 and is also shown in FIG. 5.

Tubing 34 may be secured manually or by a holding structure before it is cut. Preferably, tubing 34 is secured by holding structure 38. Holding structure 38 may be V-shaped, semi-circular, rectangular or any other shape which prevents tubing 34 from rolling. Projections 40 and 42 prevent tubing 34 from moving along the axis of the tubing. Specifically, one edge of tubing 34 is placed underneath J-shaped projection 40. Then, projection 42 keeps the other end of tubing 34 from moving and secures tubing 34 under J-shaped projection 40. Preferably, holding structure 38 is secured so as to be immobile. Specifically, it may be secured by a vise clamped to vise receiver 48. Alternatively, a surface-edge brace 44 may be coupled to one end of holding structure 38. Brace 44 fits over the edge of a surface such as a table or workbench, and tubing 34 is cut by pulling device 20 away from brace 44. The pressure from pulling device 20 keeps brace 44 secured to the surface edge. Structure 38 may include both a vise receiver 48 and a surface-edge brace 44 so that it may be secured in various ways.

Device 20 may have one blade, two blades or a plurality of blades. Preferably, device 20 has two blades 26 which are coupled to sides 22*b* and 22*c* of block 22 and have hook-shaped cutting edges 26*a*. Most preferably, each of blades 26 has two hook-shaped cutting edges 26*a*, as shown in FIG. 1, allowing blade 26 to simply be rotated rather than replaced if one cutting edge 26*a* becomes dull. As shown in FIG. 3, each cutting edge 26*a* extends beyond concave engaging surface 22*d* of block 22 and is positioned to cut tubing at an angle less than 90 degrees with respect to the tangent line T of the tubing at the point where each blade contacts the tubing. Preferably, each blade 26 is positioned to cut at approximately a 60 degree angle. The existence of an angled cutting approach rather than a perpendicular approach is critical. Forces from the residual stresses of a section of tubing act against the blades when cutting the tubing. However, such forces seem to have less of a pinching or binding effect on blades which cut at angles less than 90 degrees as compared to blades which cut perpendicular to the tangent line of the tubing.

Block 22 can be any shape so long as blades 26 are positioned to cut at the desired angle. Preferably, surface 22*d* of block 22 is an engaging surface for receiving cylindrical tubing. Most preferably, it is a concave engaging surface.

Protective guards 28 are coupled to block 22. Part of each protective guard 28 extends beyond surface 22*d* and acts to shield the operator using device 20 from blade 26. This is a safety feature of the present invention. Preferably, protective guards 28 frictionally secure blades 26 to block 22 by pinching or holding blades 26 in indentations 23 of sides 22*b* and 22*c*. As blades 26 are pulled through tubing 34, it is displaced outwardly. Thus, preferably, protective guards 28 are configured to define a relief area 29 between blade 26 and protective guards 28, as shown in FIG. 3, so that the displaced tubing may expand outwardly without any restrictions. Specifically, protective guards 28 are configured so that the part 28*a* of the protective guard which extends beyond surface 22*d* is narrower in width than the part 28*b* which is coupled to side 22*b* or 22*c*. Such a configuration enables a space 29 to be defined between the parts of each blade and each protective guard which extend beyond surface 22*d*. This space 29 acts as a relief area as tubing 34 is cut.

Device 20 may be a hand-held device if block 22 is coupled with a handle or multiple handles. Handle 24 may be coupled to any side of block 22 so long as it provides leverage to pull block 22. Preferably, handle 24 is coupled to end 22*a*. Furthermore, handle 24 may be coupled to block 22 in a variety of angles depending upon the leverage which the operator needs. For instance, it may be attached to give the operator more pulling force when cutting tubing with greater wall thickness.

Holding structure 38 and device 20 may be made in various sizes to accommodate cutting of tubing with various diameters. Preferably, device 20 is used to cut pliable tubing such as polymer tubing, plastic tubing or rubber tubing. Preferably, block 22 and blade guard 28 are comprised of aluminum, handle 24 is comprised of plastic, and blade 26 is comprised of a suitable metal such as steel.

In operation, after tubing 34 is secured, cutting edges 26*a* of device 20 are hooked over an end of a section of tubing 34. Device 20 is then pulled so as to make longitudinal cuts in the tubing. Once two longitudinal cuts are made, a section of tubing may be removed so as to create a space. This space allows one access to the core of the tubing. If soil is in the tubing, sub-samples of soil may be removed along this open section.

From the foregoing, it will be seen that this invention is one well-adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

I claim:

1. A device for cutting soil sampling tubing, comprising:

a block presenting a substantially continuous arcuate engaging surface for receiving tubing;

a protective guard coupled to said block with a portion of said protective guard extending beyond said arcuate engaging surface; and a blade coupled to said block and positioned between said block and said protective guard with a portion of said blade intersecting and extending beyond said arcuate engaging surface, said portion of said blade forming an angle less than 90 degrees with respect to a tangent line of said arcuate engaging surface at a point where said blade intersects said arcuate engaging surface, wherein a space is defined between said portion of said blade and said portion of said protective guard.

2. The device of claim 1, wherein said angle is approximately 60 degrees.

3. The device of claim 1, wherein said blade has at least one hook-shaped portion.

4. The device of claim 1, wherein said blade is frictionally secured between said block and said protective guard.

5. The device of claim 1, further comprising:

a second blade coupled to said block and spaced from said first-mentioned blade with a portion of said second blade intersecting and extending beyond said arcuate engaging surface, said portion of said second blade forming an angle less than 90 degrees with respect to a tangent line of said arcuate engaging surface at a point where said second blade intersects said arcuate engaging surface.

6. The device of claim 1, further comprising:

a handle coupled to said block and extending at an angle less than 90 degrees with respect to a longitudinal line extending along said engaging surface of said block.

* * * * *